(12) United States Patent
Ito et al.

(10) Patent No.: US 6,277,167 B1
(45) Date of Patent: Aug. 21, 2001

(54) SOIL CONDITIONER AND SOIL-AMELIORATING METHOD

(75) Inventors: Eizo Ito; Naoki Ito, both of Tokyo (JP)

(73) Assignee: Shinei Fermentec Corporation, Tokyo (JP)

( * ) Notice: Subject to any disclaimer, the term of this patent is extended or adjusted under 35 U.S.C. 154(b) by 0 days.

(21) Appl. No.: 09/375,558

(22) Filed: Aug. 17, 1999

(30) Foreign Application Priority Data

Aug. 18, 1998 (JP) .................................................. 10-247811

(51) Int. Cl.$^7$ ........................................................ C05F 11/08

(52) U.S. Cl. .............................. 71/6; 47/DIG. 10; 71/903

(58) Field of Search ..................... 71/6, 903; 47/DIG. 10; 405/264

(56) References Cited

U.S. PATENT DOCUMENTS 4,345,032 * 8/1982 Hata ........................................... 71/6

FOREIGN PATENT DOCUMENTS

| 2288720 | * | 5/1976 | (FR) | ............................................ | 71/6 |
| 215886 | * | 8/1989 | (JP) | ............................................ | 71/6 |

OTHER PUBLICATIONS

Abstract of Japanese 05–078663 published Sep. 24, 1991.*
Chemical Abstracts 97:54793, (1982) (No Month).*
Chemical Abstracts 97:54792, (1982) (No Month).*
Chemical Abstracts 125:246665, (1996) (No Month).*

* cited by examiner

Primary Examiner—Wayne Langel
(74) Attorney, Agent, or Firm—Sughrue, Mion, Zinn, Macpeak & Seas, PLLC

(57) ABSTRACT

A soil conditioner which improves the soil productivity (heart) inherent to soil by means of the oxidation and environmental activity of microorganisms and various metabolites thereof without using agricultural chemicals or chemical fertilizers in large quantities and which provides crops with the soil as an easily utilizable component, so that the yields of the crops can be increased and that the crops can be improved in savors, and a method of ameliorating soils, the soil conditioner containing at least one of *Lactobacillus paracasei* subsp. *paracasei*, *Enterococcus malodoratus* and *Candida lipolytica*.

4 Claims, No Drawings

SOIL CONDITIONER AND SOIL-AMELIORATING METHOD

BACKGROUND OF THE INVENTION

1. Field of the Invention

The present invention relates to a soil conditioner and a method of ameliorating soils.

2. Description of the Prior Art

Considered important in modern agriculture have been and are breeding in various ways and the application of chemical fertilizers and agricultural chemicals in large quantities. In fact, agriculture which is strong against damage by diseases, gives high yields and saves time and labor has been realized as a consequence.

However, increases in yields have now reached the limit, and the following problems are newly caused.

The first problem is an environmental problem. Nitrogen and phosphorus discharged from chemical fertilizers flow into rivers to cause an eutrophication in lakes and marshes, and a water bloom and a red tide are caused.

Further, agricultural chemicals have a serious influence not only on the health of workers themselves but also on neighboring inhabitants, and they further cause damage on the health of consumers as residual chemicals.

The second problem is that soil is oxidized with an excessive increase in soil productivity with the application of chemical fertilizers so that the soil is fatigued and that crops fail to produce original nutrients and show savors different from those of original crops. For this reason, it is said that that vegetables grown in open fields old days were delicious.

The third problem is that the yields which are attained in conventional procedures have reached limitations.

SUMMARY OF THE INVENTION

It is an object of the present invention to provide a soil conditioner which improves the soil productivity (heart) inherent to soil by means of the oxidation and environmental activity of microorganisms and various metabolites thereof without using agricultural chemicals or chemical fertilizers in large quantities and which provides crops with the soil as an easily utilizable component, so that the yields of the crops can be increased and that the crops can be improved in savors, and a method of ameliorating soils.

The above object is achieved by any one of the following constitutions (1) to (4).

(1) A soil conditioner containing at least one of *Lactobacillus paracasei* subsp. *paracasei*, *Enterococcus malodoratus* and *Candida lipolytica*.

(2) A soil conditioner containing *Lactobacillus paracasei* subsp. *paracasei*, *Enterococcus malodoratus* and *Candida lipolytica*.

(3) A method of ameliorating soil, which comprises applying at least one of *Lactobacillus paracasei* subsp. *paracasei*, *Enterococcus malodoratus* and *Candida lipolytica* to soil for growing crops.

(4) A method of ameliorating soil, which comprises applying a mixture containing *Lactobacillus paracasei* subsp. *paracasei*, *Enterococcus malodoratus* and *Candida lipolytica* to soil for growing crops.

In the present invention, the productivity (heart) inherent to soil is improved by the activity of the above bacteria and yeast and the soil is provided as a component easily utilizable for crops, whereby the yields of crops can be increased and the crops can be improved in savors, and the like.

DETAILED DESCRIPTION OF THE INVENTION

Specific constitutions of the present invention will be explained hereinafter.

The soil conditioner of the present invention contains at least one of *Lactobacillus paracasei* subsp. *paracasei*, *Enterococcus malodoratus* and *Candida lipolytica*, while it preferably contains all of them.

Lactobacillus is Gram-positive bacillus which ferments saccharose to generate lactic acid mainly. In *Lactobacillus paracasei* subsp. *paracasei*, examples isolated from dairy products, sewer, silage and clinical materials are known. As *Lactobacillus paracasei* subsp. *paracasei*, it is preferred to use *Lactobacillus paracasei* subsp. *paracasei* which the present Applicant has internationally deposited in Agency of Industrial Science and Technology, National Institute of Bioscience and Human Technology, Patent Microorganism Depository as DDD-a (Accession No. FERM BP-6463) under Budapest Treaty on international accession of deposition of microorganisms under patent procedures (international deposition will be used in this sense hereinafter).

The bacteriological properties of the above *Lactobacillus paracasei* subsp. *paracasei* will be explained below.

| Items tested | Test results |
| --- | --- |
| Morphology | vacillus |
| Gram stainability | + |
| Spore | − |
| Mobility | − |
| Behavior to oxygen | fucultative anaerobic |
| Catalase | − |
| Formed lactic acid | L(+) |
| Gas generation from glucose | − |
| Gas generation from glucoate | + |
| Growing at 15° C. | + |
| Growing at 45° C. | − |
| Capability of fermentation of saccharose | |
| Amygdalin | + |
| Arabinose | − |
| Aesculin | + |
| Fructose | + |
| Galactose | + |
| Glucose | + |
| Gluconate | + |
| Lactose | + |
| Maltose | + |
| Mannitol | + |
| Mannose | + |
| Melezitose | + |
| Melibiose | − |
| Raffinose | − |
| Rhamnose | − |
| Ribose | + |
| Salicin | + |
| Sorbitol | + |
| Sucrose | + |
| Trehalose | + |
| Xylose | − |
| GC content (mol %) of DNA in microorganism*1 | 46 |

*1 According to HPLC method

Enterococcus is known as enteric coccus, and an example isolated from cheese is known as *Enterococcus malodoratus*.

As *Enterococcus malodoratus*, it is preferred to use *Enterococcus malodoratus* which the present Applicant has internationally deposited in Agency of Industrial Science and Technology, National Institute of Bioscience and Human Technology, Patent Microorganism Depository as DDD-b (Accession No. FERM BP-6464).

The bacteriological properties of the above *Enterococcus malodoratus* will be explained below.

| Items tested | Test results |
| --- | --- |
| Morphology | streptococcus |
| Gram stainability | + |
| Spore | – |
| Mobility | – |
| Behavior to oxygen | Fucultative anaerobic |
| Catalase | – |
| Gas generation from glucose | – |
| Formed lactic acid | L(+) |
| Growing at 15° C. | + |
| Growing at 45° C. | – |
| Growing in the presence of 6.5% NaCl | + |
| Growing at pH 9.6 | + |
| Growing in the presence of 40% bile | + |
| Hemolysis | α-hemolysis |
| Arginine dihydrolase | – |
| Hippuric acid | – |
| Hydrolsys of aesculin | + |
| Growing in 0.1% methylene blue milk | – |
| VP reaction | – |
| Formation of acids | |
| Xylose | – |
| Rhamnose | + |
| Sucrose | + |
| Lactose | + |
| Melibiose | + |
| Raffinose | + |
| Melezitose | +*1 |
| Glycerol | – |
| Adonitol | –*2 |
| Sorbitol | + |
| Mannitol | + |
| L-Arabinose | – |
| Generation of yellow dyestuff | – |
| GC content (mol %) of DNA in microorganism*2 | 40 |

*1 Atypical property
*2 According to HPLC method

The genus Candida is yeast coming under incomplete fungi, and *Candida lipolytica* has lipase and is therefore isolated as a microoganism which causes the deterioration of butter, margarine and the like. Examples isolated from olive, soil and animals including human being have been found.

As *Candida lipolytica*, it is preferred to use *Candida lipolytica* which the present Applicant has internationally deposited in Agency of Industrial Science and Technology, National Institute of Bioscience and Human Technology, Patent Microorganism Depository as DDD-c (Accession No. FERM BP-6465).

The bacteriological properties of the above DDD-C, *Candida lipolytica*, will be explained below.

| Items tested | Test results |
| --- | --- |
| Morphology of trophocyte | oval ~ elliptical ~ cyllindrical |
| Morphology of growth | multipolar budding |
| Liquid culture | Precipitation and formation of a skim observed (25° C., 3 days) |
| Pseudomycellium | formed (25° C., 3 days) |
| Fungus | formed (25° C., 3 days) |

-continued

| Items tested | Test results |
| --- | --- |
| Ascospore | Formation not observed in any of ADAMS, GORODKOWA, malt, YM, V-8 and potato dextrose media. |
| Capability of fermentation | |
| Glucose | – |
| Galactose | – |
| Sucrose | – |
| Maltose | – |
| Lactose | – |
| Raffinose | – |
| Capability of Assimilation | |
| Galactose | – |
| Sucrose | – |
| Maltose | – |
| Cellobiose | – |
| Trehalose | – |
| Lactose | – |
| Melibiose | – |
| Raffinose | – |
| Melezitose | – |
| Starch | – |
| D-Xylose | – |
| L-Arabinose | – |
| D-Ribose | + |
| L-Rhamnose | – |
| Glycerol | + |
| Erythritol | + |
| Ribitol | – |
| D-Mannitol | + |
| Lactate | + |
| Succinate | + |
| Citrate | + |
| Inositol | – |
| Capability of Assimilation of nitrate | – |
| Growth at 37° C. | – |
| Growth in vitamin-deficient medium | – |
| Decomposition of urea | slightly |
| Color DBB | – |
| Lipase | + |

The above three strains of microorganisms are well grown in any medium if the medium is a general nutrient medium. *Lactobacillus paracasei* subsp. *paracasei* and *Enterococcus malodoratus* are particularly preferably grown in an MRS medium, and *Candida lipolytica* is particularly preferably grown in a YM medium.

Any of the above strains of microorganisms well grow when cultured approximately at 15 to 45° C.

In the method of ameliorating soils provided by the present invention, a microorganism dispersion prepared by dispersing at least one of the above three strains of microorganisms is sprayed to soil for growing agricultural crops. The above microorganism dispersion is a dispersion of the above microorganisms in a liquid medium. When the microorganism dispersion contains all of the tree strains of microorganisms, the amount ratio of the strains of the microorganisms is not critical. That is, when the above strains of the microorganisms are allowed to be co-present in water, they are stabilized in a nearly constant amount ratio depending upon preservation or culture conditions. However, when the preservation or culture conditions are properly set so as to attain the following amount ratio, the function of ameliorating soils can be remarkably efficiently exhibited.

*Lactobacillus paracasei* subsp. *paracasei:* 20 to 60%

*Enterococcus malodoratus:* 20 to 60%

*Candida lipolytica:* 10 to 30%

When the above microorganism dispersion is actually sprayed to soil, the microorganism dispersion is diluted with water and the diluted dispersion is sprayed. When the microorganism dispersion is diluted, the resultant diluted microorganism dispersion has a concentration of approximately $10^3$ to $10^4$ microorganisms per milliliter. Further, the application amount of the diluted dispersion is preferably approximately 1,000 to 2,000 cc per 1 $m^2$ of soil. When the diluted dispersion is applied in an amount greater than the above range, no adverse effect on soil is observed. That is, the above upper limit of the application amount is determined simply in view of a cost.

Any of the above strains of the microorganisms are preferably reserved in a state where a group of the microorganisms are fixed on a carrier so that they are easy to handle.

The carrier for fixing a group of the microorganisms preferably has a large capacity for holding the microorganisms and enables the easy activation of the microorganisms.

The carrier is preferably selected from stones and rocks (e.g., perlite and diatomite) or a pulverized product thereof, gravel, sand, plastic, ceramic (e.g., alumina, silica, natural zeolite and synthetic zeolite), and talc. It is particularly preferred to use a porous material having continuous pores such as porous ceramic or porous plastic. For example, it is preferred to use a fine powder (trade name: Perlite) obtained by heat-treating a pulverized product of perlite at a high temperature under high pressure and sharply reducing the pressure to convert it to porous material, since it has the property of allowing microorganisms to adhere thereto and keep them alive. The above porous material preferably has a pore diameter of approximately 2 to 10 $\mu$m. The form of the above carrier may be any one of a mass, particles, a powder, a fine powder, a plate and an acicular material, while the carrier is preferably a powder having an average particle diameter of 2 mm or less, particularly preferably a powder having an average particle diameter of approximately 50 $\mu$m to 1 mm. A group of the microorganisms fixed to the above carrier may be used in a state where it is contained in a container well permeable to water or gas such as a container made of cloth or a net.

Further, a woven fabric or non-woven fabric in the form of a ribbon or a sheet may be used as the above carrier.

When the carrier is allowed to support a group of the microorganisms, the carrier and the microorganism dispersion in the present invention may be mixed and then the mixture may be dried, while a group of the microorganisms may be cultured on the carrier.

Although differing depending upon supporting conditions, the amount of a group of the supported microorganisms is preferably 5 to 20,000,000,000 microorganisms/$cm^3$, more preferably 10 to 10,000,000,000 3 microorganisms/$cm^3$.

Further, none of the above three strains of the microorganisms have exhibited toxicity.

EXAMPLES

The present invention will be explained more in detail with reference to Examples hereinafter.

A rape cake and the like were dissolved in water and allowed to completely decay and aged to prepare a medium, and the same microorganisms as DDD-a, DDD-b and DDD-c deposited in the above Patent Microorganism Depository were planted in the medium under aeration. The medium which was brought into a logarithmic growth phase was diluted with water 100 times, to obtain a diluted microorganism dispersion. The microorganism dispersion was sprayed to an orchard at a rate of approximately 1,000 $cC/m^2$. The total number of the microorganisms in the microorganism dispersion was approximately $10^3$/ml. Further, the amount ratio of DDD-a:DDD-b:DDD-c was approximately 40:40:20%.

Various crops were grown in paddy land, an upland field and an orchard (application plots, Examples) treated in the same manner as above and conventional plots (Comparative) under the same conditions. In addition, a chemical fertilizer ("Kumiai Kagaku Hiryo", nitrogen 15%, phosphoric acid 15% and potassium 15%) supplied by Cope Chemical K.K. was readjusted to 13.3% of nitrogen, 16.7% of phosphoric acid and 11.7% of potassium and applied to the above application plots and conventional plots approximately at a rate of 60 kg/10 ha. As a result, excellent results were obtained in the application plots as compared with the results in the conventional plots.

Results

Rice Harvest:

The yield was 1.3 to 2 times as large. Roots grew longer, and stalks grower fat so that rice plants were highly resistant to typhoons. Stalks grew large and the savor of rice greatly improved.

Eggplant:

The yield was 3 to 4 times as large. Stalks grew large and leaves were also large.

Gourd:

The yield was 1.5 times as large.

Tomato:

The yield was twice as large.

Potato:

The yield was 3 times as large. Tubers themselves grew large with an increased amount of starch.

Watermelon:

The yield was 3 times as large. Watermelons grew very large, and the sugariness was twice as large.

Pumpkin:

The yield was 3 times as large. Pumpkins were very large and free of pores.

Peach:

The yield was twice as large, and the sugariness was 2.5 times as large.

Tea:

The vitamin C content increased by 40%.

Pear:

The yield was twice as large, and the sugariness was 1.5 times as large.

A kind of Chinese cabbage (Komatsuna):

The yield was 1.5 times as large.

Corn:

The yield was 1.5 times as large.

Cabbage:

The yield was 1.2 times as large.

Leek:

The yield was 1.4 times as large.

Sugarcane:

The yield was 1.5 times as large. The sugariness was 1.2 times as large.

Broad bean:

The yield was 1.5 times as large.

Cherry:

The yield was 1.2 times as large, and the sugariness was 1.3 times as large.

Apple:

The yield was 1.3 times as large, and the sugariness was 1.5 times as large.

Carrot:

The yield was 1.8 times as large.

Spinach:

The yield was 1.5 times as large.

According to the present invention, generally, stalks grew large, roots grew longer, leaves grew larger, and photosynthesis took place to a greater extent. Therefore, the yields increased, the sugariness increased, the content of nutrients such as vitamins increased, and the growth rate increased, and the above plants became strong against damage caused by winds and rains.

Further, when each strain of the above microorganisms were respectively tested according to the same application as the above, the yields were lower than those attained by the application of three strains of the microorganisms in combination, while it was found that the effects of each strain of the microorganisms were higher than those in conventional plots.

Further, soils of the above application plots (to which the present soil conditioner had been applied) and the conventional plots were respectively analyzed 6 months after the application of the soil conditioner. Table 1 shows the results.

TABLE 1

| Items measured | Conventional plot (Comparative Example) | Application plot (Example) |
| --- | --- | --- |
| Hydrogen ion concentration | 5.2 | 5.5 |
| Lime saturation degree | 31% | 47% |
| Magnesia saturation degree | 16% | 22% |
| Exchangeable magnesia | 48 mg | 71 mg |
| Exchangeable potassium | 28 mg | 70 mg |
| Potassium saturation degree | 10% | 21% |
| Effective phosphoric acid | 60 mg | 85 mg |

TABLE 1-continued

| Items measured | Conventional plot (Comparative Example) | Application plot (Example) |
| --- | --- | --- |
| Base saturation degree | 55% | 70% |
| Exchangeable calcium oxide | 178 mg | 252 mg |
| Humus | 7.0% | 7.2% |

As is clear in Table 1, the soil was improved in almost all items tested. The reason therefor is considered as follows. Fertilizer components present in the soil were decomposed by the microorganisms into components which were more easily absorbed into plants. Further, the soil was apparently changed to a state of a powder containing a large amount of air, which brought conditions suitable for the rhizosphere of the plant together with the respiration activity of the microorganisms and greatly worked on the promotion of growth of the plants.

This application is based on Japanese patent application No.10-247811 filed Aug. 18, 1998, the content of which is incorporated hereinto by reference.

What is claimed is:

1. A soil conditioner containing *Candida lipolytica* and at least one microorganism selected from the group consisting of *Lactobacillus paracasei* subsp. *paracasei* and *Enterococcus malodoratus*.

2. A soil conditioner containing *Lactobacillus paracasei* subsp. *paracasei*, *Enterococcus malodoratus* and *Candida lipolytica*.

3. A method of ameliorating soil, which comprises applying *Candida lipolytica* and at least one microorganism selected from the group consisting of *Lactobacillus paracasei* subsp. *paracasei* and *Enterococcus malodoratus* to soil for growing crops.

4. A method of ameliorating soil, which comprises applying a mixture containing *Lactobacillus paracasei* subsp. *paracasei*, *Enterococcus malodoratus* and *Candida lipolytica* to soil for growing crops.

\* \* \* \* \*